United States Patent
Endo

(10) Patent No.: US 6,483,992 B1
(45) Date of Patent: Nov. 19, 2002

(54) DISPOSITION STRUCTURE OF ZOOM DRIVE GEAR FOR A CAMERA

(75) Inventor: Ken Endo, Saitama (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 90 days.

(21) Appl. No.: 09/594,340

(22) Filed: Jun. 15, 2000

(30) Foreign Application Priority Data

Jun. 16, 1999 (JP) ............................................ 11-169215

(51) Int. Cl.⁷ .............................................. G03B 17/00
(52) U.S. Cl. ........................................................ 396/72
(58) Field of Search ..................................... 396/72, 85

(56) References Cited

U.S. PATENT DOCUMENTS

| | | | |
|---|---|---|---|
| 5,198,932 A | * | 3/1993 | Takamura .................... 359/694 |
| 5,394,210 A | | 2/1995 | Nomura et al. |
| 5,430,516 A | | 7/1995 | Uziie et al. |
| 5,594,589 A | * | 1/1997 | Chen ........................... 359/826 |
| 5,701,208 A | | 12/1997 | Sato et al. |
| 6,266,486 B1 | * | 7/2001 | Kohno .......................... 396/72 |

* cited by examiner

Primary Examiner—Russell Adams
Assistant Examiner—Michelle Nguyen
(74) Attorney, Agent, or Firm—Greenblum & Bernstein, P.L.C.

(57) ABSTRACT

In a camera, a drive gear receiving portion (32) for receiving a drive gear (28) is defined in a space by a lens-barrel portion (14) and a shielding cover (26) removably mounted to the lens-barrel portion (14). At the location constituting the drive gear receiving portion (32) on the lens-barrel portion (14), there is provided a notch (34). The drive gear (28) is moved from radially outside of the lens-barrel portion (16) inwardly to the notch (34), whereby the drive gear (28) engages with a gear (2010) of a zoom gear train (20), and with a gear portion (1602) of the lens-barrel block (16) through the notch formed on the lens-barrel portion (14) therethrough. The shielding cover (26) is moved from radially outside of the lens-barrel portion (16) inwardly to be mounted removably on the lens-barrel portion (14).

18 Claims, 3 Drawing Sheets

DISPOSITION STRUCTURE OF ZOOM DRIVE GEAR FOR A CAMERA

BACKGROUND OF THE INVENTION

The present invention relates to a disposition structure of a drive gear located at the output end of a zoom gear train in a camera.

In a camera having a zooming mechanism, a lens-barrel block is retractably disposed in a cylindrical lens-barrel portion formed on a housing, and a zoom gear train is disposed outside the lens-barrel portion. A drive gear constituting a zoom gear train and being located at the output end of the zoom gear train is engaged with a gear portion of the lens-barrel block so that the lens-barrel block moves forward and backward of the lens-barrel portion via a mechanism for converting a rotary motion into a linear motion. In a camera of this type, in many cases, each gear constituting a zoom gear train including a drive gear, has a shaft extending forward and backward of the lens barrel portion, in other words, extending forward and backward of the camera, and the rear end of such a shaft is supported by the wall portion provided at the rear of the lens-barrel, and the front end thereof is supported by a holding member provided independently of the lens barrel.

Since the drive gear is engaged with the gear portion of the lens-barrel block through a notch formed on the lens-barrel portion, the drive gear is inserted into the interior of the wall portion swelling outwardly in the direction of the radius of the lens-barrel portion from the front thereof in order to prevent a light from entering through the notch into the lens-barrel portion.

Therefore, in this disposition structure of a zoom gear train, there is a recognized disadvantage that assembly of the drive gear consumes much time and effort because the drive gear has to be engaged both with a gear of a zoom gear train and a gear portion of the lens barrel block from the front of the lens-barrel portion in a direction in which the axes of such gear and gear portion extend.

In addition, since all the gears constituting a zoom gear train are to be supported on their shaft by the holding means after they are assembled, there is also a recognized disadvantage that, in case where a test on a zoom gear train excluding a drive gear is to be conducted, a test on the zoom gear train cannot be conducted easily because it requires quite cumbersome procedures such as removing the holding member, taking out the drive gear, then after the drive gear has taken out, mounting the holding member again.

The present invention is thus contemplated with aforementioned circumstances in view. Accordingly, it is an object of the present invention to provide a disposition structure of a zoom drive gear wherein both assembly of the drive gear and testing on a zoom gear train excluding the drive gear may be performed easily.

SUMMARY OF THE INVENTION

In order to achieve the object described above, the present invention provide a camera comprising a lens-barrel block disposed in a cylindrical lens-barrel portion formed on a housing so as to be movable along the axis of the lens-barrel portion, a zoom gear train disposed outside of the lens-barrel portion, a drive gear constituting the zoom gear train and being located at the output end of the zoom gear train and engaged with the gear portion of the lens-barrel block, and the lens-barrel block being moved along the aforementioned axis of the lens-barrel portion by driving the zoom gear train, characterized in that the drive gear receiving portion for receiving the drive gear is provided between the lens-barrel portion and the shielding cover removably mounted to the lens-barrel portion from radially outside of the lens-barrel, that the drive gear receiving portion includes a notch formed on the lens-barrel portion through which the drive gear engages with the gear portion of the lens-barrel block, and that assembling of the drive gear is performed by moving the drive gear from radially outside of the lens-barrel portion inwardly toward the notch with the shielding cover opened.

According to the present invention, the assembly of the drive gear may be performed easily since the drive gear is engaged both with the gear of the zoom gear train and the gear portion of the lens-barrel by moving the drive gear inwardly along the direction orthogonal to the axes of the gear and the gear portion described above.

In addition, removing the shielding cover enables the drive gear to be removed alone, which facilitates the test on the zoom gear train.

The present disclosure relates to the subject matter contained in Japanese patent application No. Hei. 11-169215 (filed on Jun. 16, 1999), which is expressly incorporated herein by reference in its entirety.

DESCRIPTION OF THE PREFERRED EMBODIMENT

Figure 1:
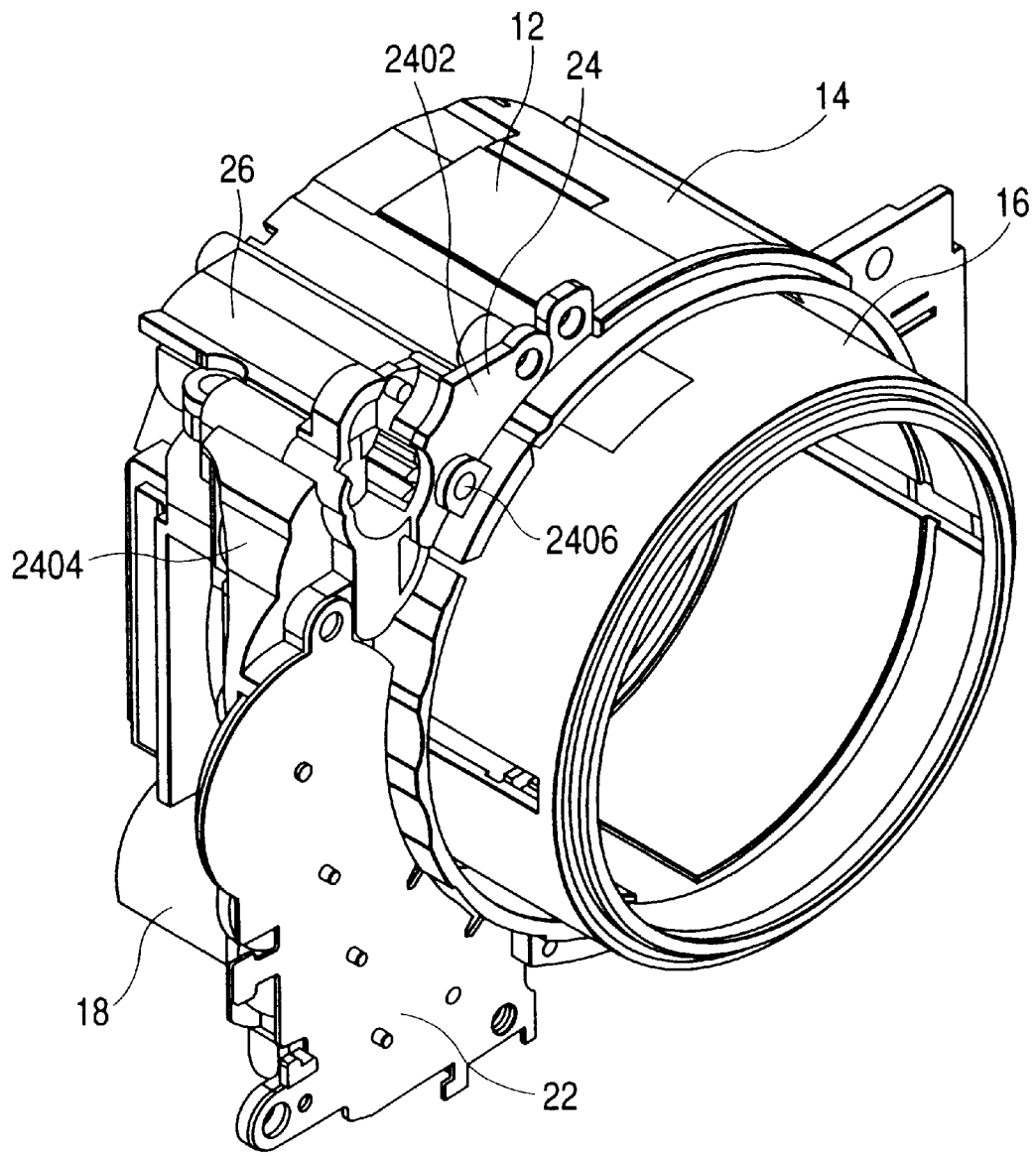
FIG. 1 is a perspective view of the lens-barrel portion with a zoom gear train incorporated therein.

Hereinafter, the best mode for carrying out the present invention will be described referring to the accompanied drawings. FIG. 1 is a perspective view illustrating the lens-barrel portion with a zoom gear train assembled, FIG. 2 is a perspective view illustrating the zoom gear train excluding the drive gear on the periphery of the lens-barrel with the first and the second holding member removed, and FIG. 3 is an explanatory drawing illustrating assembling of the drive gear in the state that the zoom gear train excluding a drive gear is covered and supported by the first and the second holding members.

Figure 2:
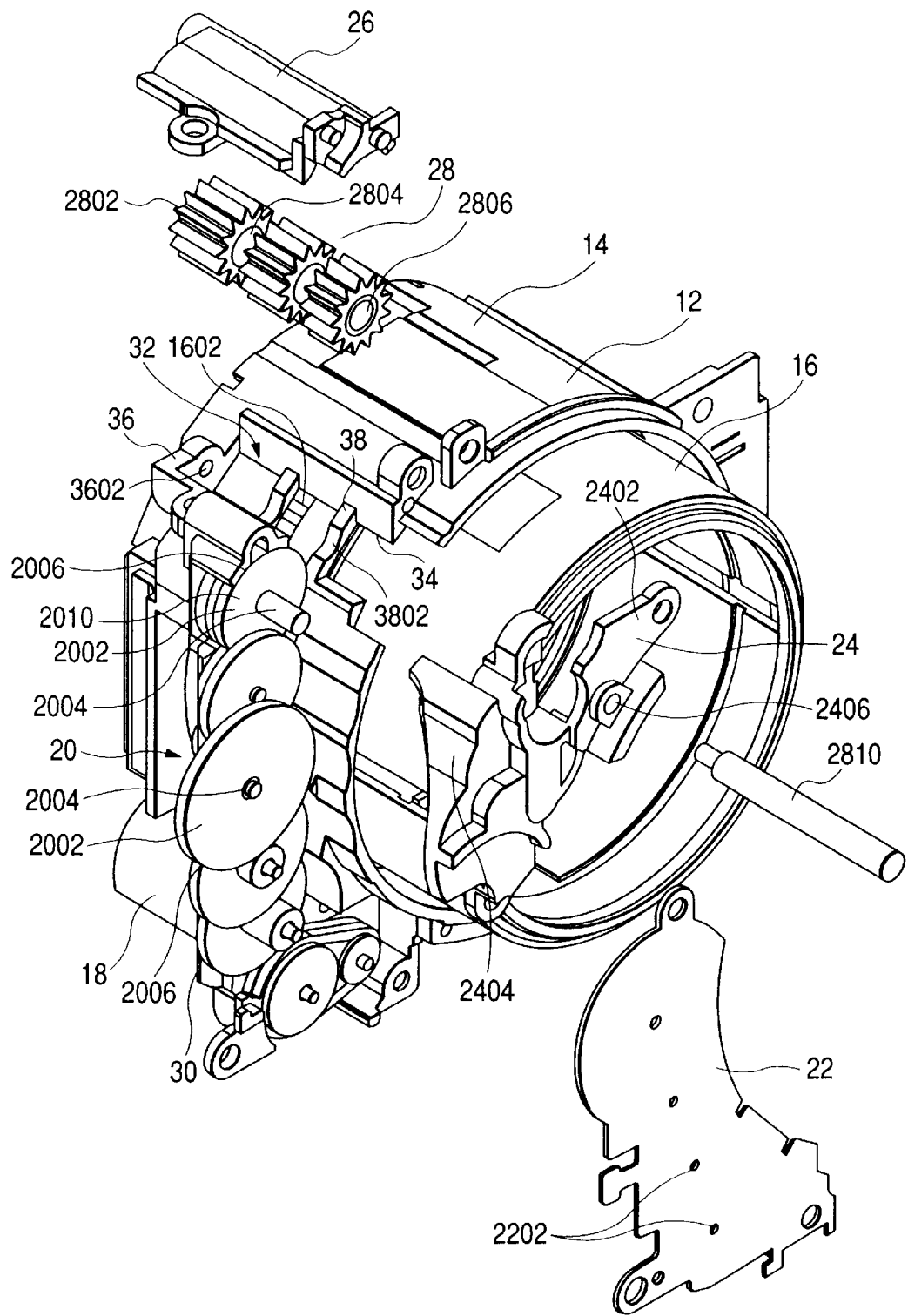
FIG. 2 is a perspective view illustrating the lens-barrel including a zoom gear train mounted on the periphery thereof with the first and the second holding means removed and the drive gear removed.
Figure 3:
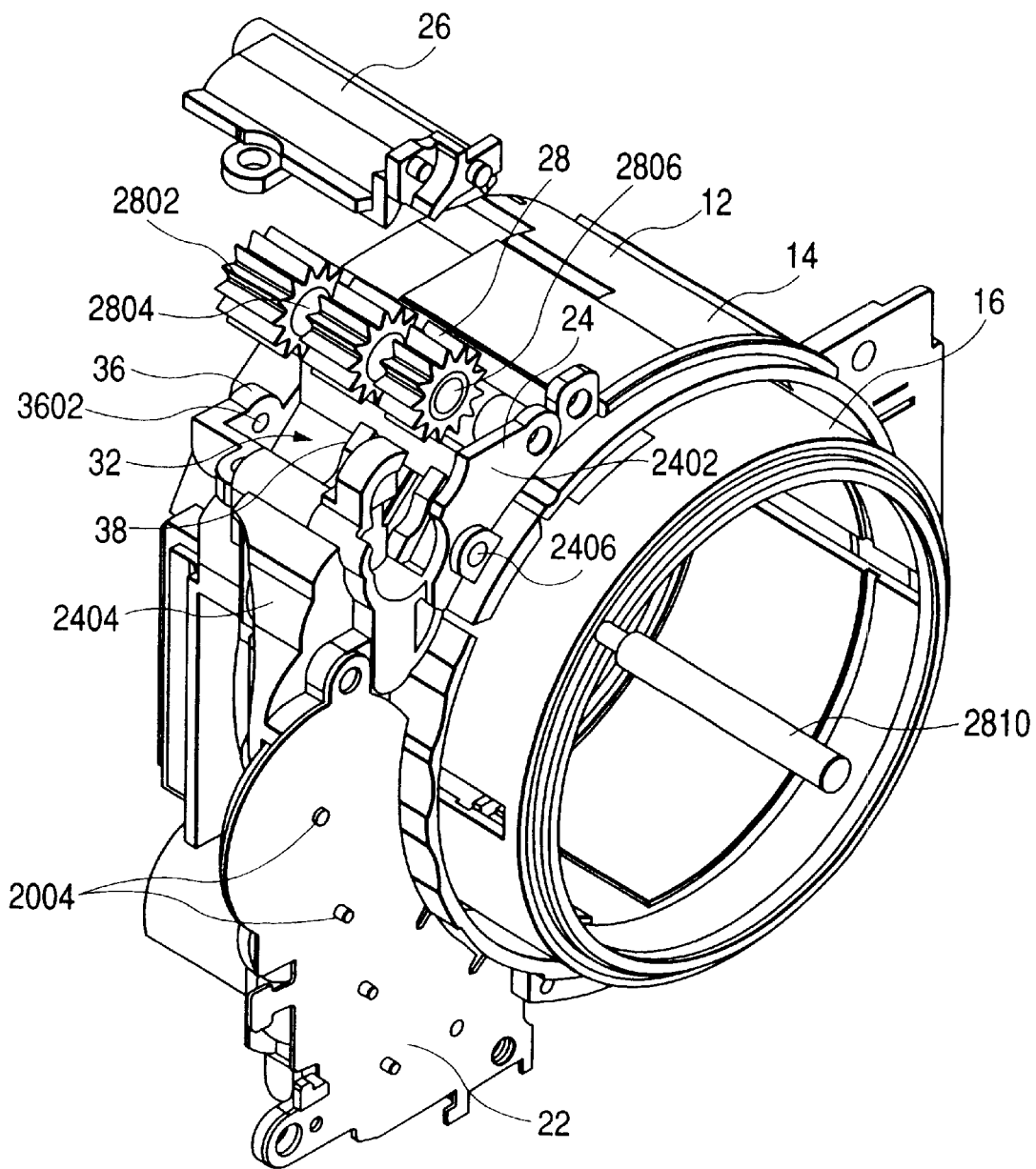
FIG. 3 is an explanatory drawing showing assembling of the drive gear in the state where the zoom gear train excluding the drive gear is covered and supported by the first and the second members.

As shown in FIGS. 1 to 3, a cylindrical lens-barrel portion 14 is integrally formed on the housing 12 of a camera so as to project in the forward and backward direction of the camera, and a lens-barrel block 16 is retractably (movably in the forward and backward direction) provided within the lens-barrel portion 14.

As shown in FIG. 2, on the outside of the lens-barrel portion 14, there are provided a zoom motor 18 and a zoom gear train 20, and the zoom gear train 20 is covered by a first holding member 22, a second holding member 24, and a shielding cover 26.

The power of the zoom motor 18 is transmitted from the drive gear 28 (zoom drive gear) located at the output end of the zoom gear train 20 via the zoom gear train 20 to the gear portion 1602 of the lens-barrel block 16 (see FIG. 2) to rotate the lens-barrel block 16. In this embodiment, the lens-barrel block 16 moves in to-and-fro motion while rotating with respect to the lens-barrel portion 14 by the helicoids groove and a pin engaging thereto, and a group of zoom lenses are moved within the lens-barrel block 16 in the direction of the optical axis by a mechanism for converting a variety of rotary motions into a linear motion by the use of a cam ring or the like to accomplish a zooming operation.

Each gear 2002 constituting a zoom gear train 20 including a drive gear 28 has a shaft 2004 extending forward and backward of the lens-barrel portion 14, the rear end of the shaft 2004 is supported by the wall portion 30 provided at the rear of the lens-barrel 14.

The front ends of the shafts of some gears 2002 of the zoom gear train 20 excluding the drive gear 28 are supported by shaft supporting bores 2202 formedon the first holding members 22 which is to be mounted to and removed from the lens-barrel portion 14 from the front side of the lens-barrel portion 14, the front ends of the shafts 2004 of the remaining gears 2002 are supported by the shaft supporting bores (not shown) formed on the front wall 2402 of the second holding member 24 which is to be mounted to and removed from the lens barrel portion 14 from the front side of the lens-barrel portion 14, and the gear portions 2006 of the zoom gear train 20 excluding the drive gear 28 are covered by a cover wall 2404 of the second holding member 24.

FIG. 3 shows the zoom gear train 20 excluding the drive gear 28 being disposed outside of the lens-barrel 14, and supported and covered by the first holding member 22 and the second holding member 24.

The first holding member 22 is formed in the shape of a plate so that it extends in front of the lens-barrel portion 14 on the plane orthogonal to the forward and backward direction of the lens-barrel 14, and the front wall 2402 of the second holding member 24 extends on the plane orthogonal to the forward and backward direction of the lens-barrel portion 14 in front of the lens-barrel portion 14.

The drive gear 28 has an axially elongated shape so that it engages with the gear portion 1602 of the lens barrel block 16 even when the lens-barrel block 16 moves forward and backward. In the present embodiment, the drive gear 28 comprises three gear portions 2802 coaxially spaced with each other and two small diameter portions 2804 being smaller than those gear portions 2802 in diameter for connecting between adjacent such gear portions 2802. The gear portion 1602 in this embodiment has such a length in the moving direction of the lens-barrel block 16 that the gear portion 1602 is kept in mesh with one or two of the three gear portions 2802 of the drive gear 28 when the lens-barrel block 16 is moved in the axial direction of the lens-barrel portion 14.

The drive gear 28 is provided with a shaft insertion bore 2806 through gear portions 2802 and small diameter portions 2804, and the drive gear 28 is rotatably supported on the shaft 2810 inserted into the shaft insertion bore 2806.

The drive gear 28 is received in the drive gear receiving portion 32 formed on the lens-barrel portion 14.

The drive gear receiving portion 32 is defined by establishing a space for receiving the drive gear 28 between the lens-barrel portion 14 and the shielding cover 26 removably mounted onto the lens-barrel portion 14, and the drive gear receiving portion 32 includes a notch 34 formed on the lens-barrel so that the gear portions 2802 of the drive gear 28 engage the gear portion 1602 of the lens barrel block 16.

The shielding cover 26 is removably mounted on the lens-barrel portion 14 by being moved inwardly from radially outside of the lens-barrel 16 so as to prevent light from entering into the lens barrel portion 14 through the drive gear receiving portion 32 and the notch 34 with the shielding cover 26 mounted on the lens-barrel portion 14.

The space on the side of the lens-barrel 14 constituting the drive gear receiving portion 32 for receiving the drive gear 28 is opening radially toward outside of the lens-barrel portion 16 with the shielding cover 26 removed from the lens-barrel portion 14.

The notch 34 extends in the forward and backward direction of the lens-barrel in correspondence with the drive gear 28 and is opened radially toward outside of the lens-barrel 16. Therefore, more specifically, the drive gear receiving portion 32 according to the present embodiment is defined by, in addition to the lens-barrel portion 14 and the shielding cover 26, the front wall 2402 of the second holding member 24 for closing the front end of the notch 34.

In the rear of the notch 34, there is a wall portion 36 of the lens-barrel 14 remaining in such a manner that it connects widthwise (direction of circumference of the lens-barrel 14) both sides of the notch 34, and on the wall 36, there is formed a shaft supporting bore 3602 through which the rear end of the shaft 2810 is fitted. On the front wall 2402 of the second holding member 24, there is provided a shaft supporting bore 2406 for inserting the shaft 2810 and supporting the front end of the shaft 2810. The support of the shaft 2810 by the shaft supporting bore 2406 is realized by friction coupling.

According to the present embodiment, in order to ensure the strength and rigidity of the lens-barrel 14 at the portion formed with a notch 34, two connecting walls 38 extending transversely of the notch 34 (in the direction of circumference of the lens-barrel 14) are provided in the lengthwise midsection of the notch 34 being spaced longitudinally with respect to each other so that these widthwise both sides of the notch 34 are interconnected by these connecting walls 38 in the lengthwise midsection of the notch 34.

These two connecting walls 38 are provided at the positions corresponding to aforementioned two small diameter portions 2804 of the drive gear 28 when being received within the drive gear receiving portion 32 so that they do not interfere with the gear portion 2802 of the drive gear 28, and on the upper surface of the each connecting wall 38, there is provided recess 3802 for establishing a sufficient clearance from the small diameter portion 2804 corresponding thereto.

Hereinafter, assembling of the drive gear 28 will be described.

In the present embodiment, as shown in FIGS. 2 and 3, a zoom motor 18 is mounted outside of the lens-barrel 14, a zoom gear train 20 excluding the drive gear 28 is mounted thereto, and then the zoom gear train 20 excluding the drive gear 28 is supported and covered by the first holding member 22 and the second holding member 24.

Then, in the rear of the front wall 2402 of the second holding member 24, the drive gear 28 is moved from radially outside of the lens barrel 14 toward the drive gear receiving portion 32 opening radially toward outside of the lens-barrel 16, and inserted into the drive gear receiving portion 32.

By this operation, the small diameter portion 2804 of the drive gear 28 is arranged above the connecting walls 38 and the gear portion 2802 of the drive gear 28 engages with the gear portion 1602 of the lens-barrel block 16 through the notch 34, and the gear portion 2802 of the drive gear 28 engages with the nearest gear 2010 located in front of the drive gear 28 at the output end of the zoom gear train 20 (see FIG. 2).

As a next step, the shaft 2810 is inserted into the shaft supporting bore 2406 from the front side of the front wall 2402 of the second holding member 24, the shaft 2810 is inserted into the shaft insertion bore 2806 of the drive gear 28, the rear end of the shaft 2810 is fitted into the shaft supporting bore 3602 of the wall portion 36, and the front end of the shaft 2810 is supported by the shaft supporting bore 2406 of the front wall 2402.

Finally, the shielding cover 26 for covering the gear portion 2802 of the drive gear 28 and for preventing a light from entering through the notch 34 into the lens-barrel 14 is fitted from radially outside of the lens-barrel 14 onto the drive gear receiving portion 32, of which the state is shown in FIG. 1.

According to the present embodiment, the drive gear 28 may be assembled easily, since the drive gear 28 is engaged both with the gear 2010 of the zoom gear train 20 and the gear portion 1602 of the lens-barrel block 16 by moving the drive gear 28 along the direction orthogonal to the axes of the gear 2010 and the gear portion 1602 of the lens-barrel block 16, or, in other words, by moving the drive gear 28 within the plane where the tooth surfaces of the gear 2010 and the gear portion 1602 extend.

Even in the case where a test on the zoom gear train 20 excluding the drive gear 28 is conducted, the drive gear 28 may be removed alone with the zoom gear train 20 kept as it is only by removing the shielding cover 26 and taking the shaft 2810 away from the shaft supporting bore 2406 formed on the front wall 2402 of the second holding member 24. In other words, since the drive gear 28 may be mounted and removed independently, a test on the zoom gear train 20 may be conducted easily.

As is appreciated from the description above, in the present invention, a drive gear receiving portion for receiving the drive gear located at the output end of the zoom gear train is provided between the lens-barrel and the shielding cover that is removably mounted from radially outside of the lens-barrel, the drive gear receiving portion includes a notch formed on the lens-barrel so that the drive gear engages with the gear portion of the lens-barrel therethrough, and assembling of the drive gear is performed by moving the drive gear from radially outside of the lens-barrel into the notch with the shielding cover opened.

Therefore, according to the present invention, assembling of the drive gear may be performed easily and a test on the zoom gear train excluding the drive gear may be conducted easily, since the drive gear may be engaged both with the gear of the zoom gear train and the gear portion of the lens-barrel block from the direction orthogonal to the axes of the gear and gear portions, and the drive gear may be removed alone simply by removing the shielding cover.

What is claimed is:

1. In a camera having a lens-barrel block disposed in a cylindrical lens-barrel portion formed on a housing so as to be movable along an axis of the lens-barrel portion, a zoom gear train disposed outside of said lens-barrel portion, a drive gear included in said zoom gear train, said drive gear located at an output end of said zoom gear train and engaged with a gear portion of the lens-barrel block, and said lens-barrel block being moved along the axis of the lens-barrel portion by driving of said zoom gear train, a disposition structure for disposing said drive gear in said camera comprising:

a drive gear receiving portion for receiving said drive gear, said drive gear receiving portion being provided between said lens-barrel portion and a shielding cover removably mounted to said lens-barrel portion from outside of said lens-barrel portion, said drive gear receiving portion including a notch; said shielding cover configured to extend over a circumferential portion of the lens barrel portion sufficient to cover said drive gear said notch being formed on said lens-barrel portion through which said drive gear engages with said gear portion of said lens-barrel block;

wherein said drive gear is assembled by moving said drive gear from outside of the lens-barrel portion inwardly toward said notch with said shielding cover removed.

2. The disposition structure of the zoom drive gear of the camera as set forth in claim 1, wherein said notch extends along said axis of the lens-barrel portion.

3. The disposition structure of the zoom drive gear of the camera as set forth in claim 2, wherein said drive gear includes a gear portion and a small diameter portion smaller in diameter than said gear portion, both portions being aligned along an axis of the drive gear, and a connecting wall is formed at a location corresponding to said small diameter portion with said drive gear received in the drive gear receiving portion, said connecting wall extending in a widthwise direction of said notch that is perpendicular to a direction in which said notch extends, while being spaced from said small diameter portion.

4. The disposition structure of the zoom drive gear of the camera as set forth in claim 3, wherein said drive gear includes a plurality of said gear portions and a plurality of said small diameter portions with said gear portions and small diameter portions are arranged alternately, and a plurality of said connecting walls spaced in the direction in which said notch extends, so as to correspond to said plurality of small diameter portions.

5. The disposition structure of the zoom drive gear of the camera as set forth in claim 3, wherein said connecting wall is provided with a recess at a location facing said small diameter portion for establishing a clearance from said small diameter portion.

6. The disposition structure of the zoom drive gear of the camera as set forth in claim 1, wherein said drive gear comprises a gear portion and a shaft, said gear portion is provided with a shaft insertion bore axially passing therethrough, and said gear portion is rotatably supported on said shaft inserted into said shaft insertion bore with said drive gear received in said drive gear receiving portion.

7. The disposition structure of the zoom drive gear of the camera as set forth in claim 6, wherein said shaft is configured to be pulled out of said drive gear receiving portion with said drive gear received within said drive gear receiving portion.

8. The disposition structure of the zoom drive gear of the camera as set forth in claim 7, wherein said lens-barrel portion extends in a forward and backward direction of the camera, a front end of said notch is open toward a front of said lens barrel portion, said drive gear receiving portion is defined by said lens-barrel portion, a holding member is provided for closing said front end of said notch, and said shaft is configured to be pulled out of a shaft supporting bore formed on said holding member.

9. The disposition structure of the zoom drive gear of the camera according to claim 1, said drive gear including a plurality of gear portions and small diameter portions, said small diameter portions having a diameter smaller than a diameter of said gear portions, said gear portions and said small diameter portions being alternately arranged, a plurality of connecting walls being provided and spaced in a direction in which said notch extends so as to correspond to said plurality of small diameter portions.

10. A support structure for a drive gear connecting a gear portion of a lens-barrel block rotatably arranged in a housing with an output end of a torque transmission system, said support structure comprising:

first and second walls provided to said housing and spaced axially from each other to define a space to which said output end and said gear portion are partially exposed, said first and second walls having respective supporting bores;

a support shaft mounted to said first and second walls through said supporting bores and removable therefrom axially;

a cover removably attached to said housing to close an outwardly facing opening of said space, said cover configured to have an axial extent sufficient to span a gap between said first and second walls wherein said drive gear is supported on said support shaft and accommodated within said space to mesh with both said gear portion and said output end.

11. The support structure as set forth in claim 10, wherein said torque transmission system includes a plurality of gears forming a zoom gear train in cooperation with said drive gear.

12. The support structure as set forth in claim 11, further comprising:

first and second holding members removably attached to said housing to cooperatively hold said zoom gear train onto said housing, said first and second holding members being located opposite from said lens-barrel block with respect to said housing.

13. The support structure as set forth in claim 12, wherein said drive gear is removable from said housing while said first and second holding member remain attached to said housing.

14. The support structure as set forth in claim 10, wherein said first wall is formed by a holding member removably attached to said housing.

15. The support structure as set forth in claim 10, further comprising:

at least one connecting wall provided to said housing and extending across an inwardly facing opening of said space.

16. The support structure as set forth in claim 10, wherein said drive gear is removable through said outwardly facing opening from said space after said cover and said support shaft are removed from said housing.

17. A method of assembling the support structure as set forth in claim 10, comprising:

inserting said drive gear through said outwardly facing opening into said space;

fitting said support shaft to said first and second walls using said supporting bores so that said support shaft passes through said drive gear; and attaching said cover to said housing to close said outwardly facing opening.

18. In a camera having a lens barrel block disposed in a cylindrical lens barrel portion formed on a housing, the lens barrel block being movable along an axis of the lens barrel portion, a zoom gear train disposed outside of the lens barrel portion, a drive gear included in the zoom gear train, the drive gear located at an output end of the zoom gear train and engaged with a gear portion of the lens barrel block, the lens barrel block being moved along the axis of the lens barrel portion by driving of the zoom gear train, a disposition structure that enables positioning the drive gear in the camera comprising:

a drive gear receiving portion that receives the drive gear, said drive gear receiving portion being provided between the lens barrel portion and a shielding cover removably mounted to the lens barrel portion from outside of the lens barrel portion, the drive gear receiving portion including a notch extending along the axis of the lens barrel portion, the drive gear including a plurality of gear portions and a plurality of small diameter portions, said small diameter portions having a diameter smaller than a diameter of said gear portions, said small diameter portions and said gear portions being alternately arranged, a plurality of connecting walls spaced in the direction of the axis of the lens barrel portion, said connecting walls corresponding to said plurality of small diameter portions;

said notch being formed on the lens barrel portion through which the drive gear engages with the gear portion of the lens barrel block;

wherein the drive gear is assembled by moving the drive gear from outside of the lens barrel portion inwardly towards said notch with said shielding cover removed.

* * * * *